(12) United States Patent
Krech

(10) Patent No.: US 7,404,122 B2
(45) Date of Patent: Jul. 22, 2008

(54) MAPPING LOGIC FOR LOADING CONTROL OF CROSSBAR MULTIPLEXER SELECT RAM

(75) Inventor: Alan Starr Krech, Ft. Collins, CO (US)

(73) Assignee: Agilent Technologies, Inc., Santa Clara, CA (US)

(*) Notice: Subject to any disclaimer, the term of this patent is extended or adjusted under 35 U.S.C. 154(b) by 265 days.

(21) Appl. No.: 11/444,449

(22) Filed: May 31, 2006

(65) Prior Publication Data

US 2007/0300117 A1 Dec. 27, 2007

(51) Int. Cl.
*G01R 31/28* (2006.01)

(52) U.S. Cl. .................. 714/724; 702/118; 702/123

(58) Field of Classification Search ............... 324/761, 324/754; 702/104, 120, 118, 123; 714/742, 714/724

See application file for complete search history.

(56) References Cited

U.S. PATENT DOCUMENTS

| 6,130,546 A * | 10/2000 | Azizi ...................... 324/761 |
| 6,671,844 B1 * | 12/2003 | Krech et al. ................ 714/736 |
| 6,963,208 B2 * | 11/2005 | Fukasawa et al. ........... 324/754 |
| 2002/0049554 A1 * | 4/2002 | Miller ....................... 702/104 |
| 2002/0173926 A1 * | 11/2002 | McCord .................... 702/120 |

* cited by examiner

*Primary Examiner*—David Ton
(74) *Attorney, Agent, or Firm*—Marc Bobys

(57) ABSTRACT

A circuit and method for efficiently configuring an ACAM Select RAM for an ACAM circuit of a tester that tests multiple devices under test (DUTs).

3 Claims, 5 Drawing Sheets

MAPPING LOGIC FOR LOADING CONTROL OF CROSSBAR MULTIPLEXER SELECT RAM

BACKGROUND OF THE INVENTION

Digital electronic devices utilize integrated circuits. Consumer expectations of high quality demands that extensive testing of the integrated circuits be performed prior to integration into an end device.

Integrated circuit manufacturers utilize large automated testers to perform entire suites of tests on integrated circuits prior to shipment. In general, a test to be performed on an integrated circuit device under test (hereinafter "DUT") consists of a set of pattern vectors that translate to stimulus voltage levels to be applied to input signal pins of the DUT according to pre-specified timing. Signals captured from output signal pins of the DUT are translated into corresponding response vectors that may be analyzed to determine whether the DUT is operating according to specification.

Integrated circuits typically include a number of signal pins used for input and output of "interesting" signals. The signal pins are typically electrically connected to test points on a board. For example, an integrated circuit may be mounted on a printed circuit board. Alternatively, an integrated circuit may be packaged and mounted in a handler (e.g., a socket) for testing. Sockets also exist for integrated circuit dies that are not yet packaged, and even for the semiconductor wafer (in the form of a translator board) on which the integrated circuit is manufactured is not yet even diced. A tester traditionally provides a set of tester interface pins which are designed to electrically connect, typically through a test fixture, to the test points on the handler. As stated previously, the test points are electrically connected to signal pins of the DUT. The conductive paths between the test points up to and including the signal pins of the DUT are traditionally called the "DUT channels".

The tester generally provides a number of signal generating resources that may generate configurable signal levels with configurable timing. The tester also provides signal processing resources capable of converting signals generated by a DUT (e.g., the analog form) into a format (e.g., the digital form) readable by the tester. The signal processing resources may also be configurable. The tester may be configured (by way of a set of relays) to electrically connect any tester resource to any tester interface pin. This process is referred to as "PE channel configuration". The electrical path between a given tester resource up to and including the tester interface pin that the resource is configured to connect to is referred to as a "pin electronics channel" (or "PE channel").

To test a DUT, the DUT is mounted on the tester such that the test points connected to DUT channels are probed by predetermined tester interface pins. The tester is configured to connect appropriate tester resources to each of the probed DUT channels by way of a PE channel. DUT channels electrically connect to PE channels in a one-to-one mapping. Various other configurations are required, for example specifying the DUT layout and setting up a given test, but ultimately the tester applies test vectors to, and receives test responses from, the DUT channels by way of the PE channels. Tester software may process the test results to determine whether or not the DUT passed the test.

The data generated for application to the DUT may originate from several sources, including test instructions (that may include addresses and data), buffer memory, and algorithmic pattern generator (APG) resources. Ultimately, test data is processed by an adjustable crossover address multiplexer (ACAM) to be multiplexed along with address information before going to PE channels and ultimately to DUT channels. The ACAM maps APG resources including X, Y, Z address components and data generator components to PE channels, which connect to DUT channels. The ACAM may be implemented with a large set of crossbar multiplexers that connect APG resources to PE channels under the control of a select signal.

A tester may allow testing of DUTs that have a narrower external data bus than its internal data word width. For example, a tester may test DUTs that have memory cells arranged in 32-bit words, but the devices may only have an 8-bit bus. This requires four bus write transactions to write the data associated with a single memory address. Accordingly, during any given test execution instruction 119, only a subset of the APG data routed to the error data PE channels 136 is applied to the DUT during any given bus cycle. The result of the above requirements is that the configuration of the ACAM must be switchable from one bus cycle to the next. This is accomplished by having the ACAM multiplexer selects sourced by a series of configuration words stored in a memory, such as a random access memory (RAM), whose address is selected each bus cycle by a microcode instruction field corresponding to the present instruction. The memory that stores the ACAM configuration words is herein referred to as the "ACAM Select RAM".

Because the tester is designed to test integrated circuit devices of varying designs, the tester must be configured at test setup time to instruct the tester which tester resources (including address and data components) should connect to which PE channels (and therefore, ultimately, which DUT channels).

Typically, mapping of tester resources to PE channels is performed by specifying, in a series of tester configuration instructions that are compiled into configuration instructions recognizable by ACAM Select RAM loading logic, an association of each resource to a corresponding PE channel for each instruction. That is to say, for every address location in the ACAM Select RAM, a test writer must keep track of the tester resources that will source the data and addresses to be applied to the various DUT channels for every DUT, and the corresponding PE channels to which these resources should be mapped. In writing the test instructions, this makes for very long configuration statements, increasing the probability of typographical errors and subsequent test debug time.

As semiconductor devices become more complicated, the number of DUT channels that require probing is increasing, which increases the complexity of the PE channel configuration. In order to maximize throughput, today's testers often allow multiple DUTs to be tested simultaneously. This is achieved by designating different groups of pin electronics channels to service different DUTs mounted in the tester. While this parallel test execution approach certainly improves over serial testing techniques, the tester configuration required during tester configuration and test setup remains lengthy. This is due to the traditional hardware-centric paradigm of configuring the tester which does not utilize any identification of particular DUTs, in either the hardware or software, in its associations between PE channels, tester resources, DUT channels, etc.

For example, referring back to the discussion of the ACAM Select RAM, in the traditional hardware-centric paradigm, tester-resource-to-PE-channel configuration must still be performed by specifying an association of the tester resource and its corresponding PE channel for each DUT, regardless of whether or not the DUTs to be tested are identical. In the typical manufacturing line case in which all of the multiple DUTs to be tested are identical, the advantages afforded by similarity of the DUT designs cannot be exploited if the tester configuration does not support the concept of DUT identification.

It would therefore be useful to have a tester configuration approach that would allow tester-resource-to-PE-channel configuration for all DUTs simultaneously, thereby reducing tester configuration time.

SUMMARY OF THE INVENTION

Embodiments of the invention include a method for configuring an ACAM Select RAM for an ACAM circuit of a tester that tests multiple devices under test (DUTs), each comprising a number of DUT channels to be probed by the tester, and each of the DUT channels mapped to and connecting to a different PE channel in the tester. The method includes the steps of obtaining a configuration instruction, the configuration instruction comprising at least one DUT channel identifier field and a corresponding tester resource identifier field; for each PE channel and for each DUT channel identifier field in the configuration instruction, comparing the DUT channel identifier specified in the DUT channel identifier field of the configuration instruction to the respective DUT channel identifier mapped to the respective PE channel; and for each PE channel whose respective DUT channel identifier matches the specified DUT channel identifier, extracting and loading tester resource configuration information specified in the corresponding tester resource identifier field of the configuration instruction into the ACAM Select RAM in a position corresponding to the respective PE channel at a current ACAM Select RAM load address.

Embodiments of the invention also include a method for configuring an ACAM Select RAM for an ACAM circuit of a tester that tests multiple identical devices under test (DUTs), the identical DUTs each comprising a number of identical corresponding DUT channels to be probed by the tester, each of the DUT channels mapped to and connecting to a different PE channel in the tester, the method comprising obtaining a configuration instruction, the configuration instruction comprising at least one DUT channel identifier field and a corresponding tester resource identifier field, the at least one DUT channel identifier field corresponding to an associated DUT channel on each of the multiple identical DUTs; for each PE channel and for each DUT channel identifier field in the configuration instruction, comparing the DUT channel identifier specified in the DUT channel identifier field of the configuration instruction to the respective DUT channel identifier mapped to the respective PE channel; and for each PE channel whose respective DUT channel identifier matches the specified DUT channel identifier, extracting and loading tester resource configuration information specified in the corresponding tester resource identifier field of the configuration instruction into the ACAM Select RAM in a position corresponding to the respective PE channel at a current ACAM Select RAM load address, wherein all PE channels associated with the DUT channel on each of the multiple identical DUTs associated with the DUT channel identifier are loaded simultaneously.

Embodiments of the invention include an ACAM control configuration circuit for loading an ACAM Select RAM, comprising a programmable DUT-to-PE-Channel translator which associates DUT channels of respective DUTs to corresponding respective PE channels; a comparator circuit which compares one or more respective DUT channel identifiers specified in corresponding one or more respective DUT channel identifier fields of a configuration instruction to the respective DUT channel identifiers associated with the corresponding respective PE channels, and which selects one or more PE channels whose corresponding DUT channel identifier matches the specified one or more respective DUT channel identifiers; and a loading circuit which loads tester resource configuration information specified in respective tester resource identifier fields corresponding to the one or more respective DUT channel identifiers of the configuration instruction into the ACAM Select RAM in respective positions corresponding to the respective selected PE channels at a current ACAM Select RAM load address.

BRIEF DESCRIPTION OF THE DRAWINGS

A more complete appreciation of this invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION

Figure 1:
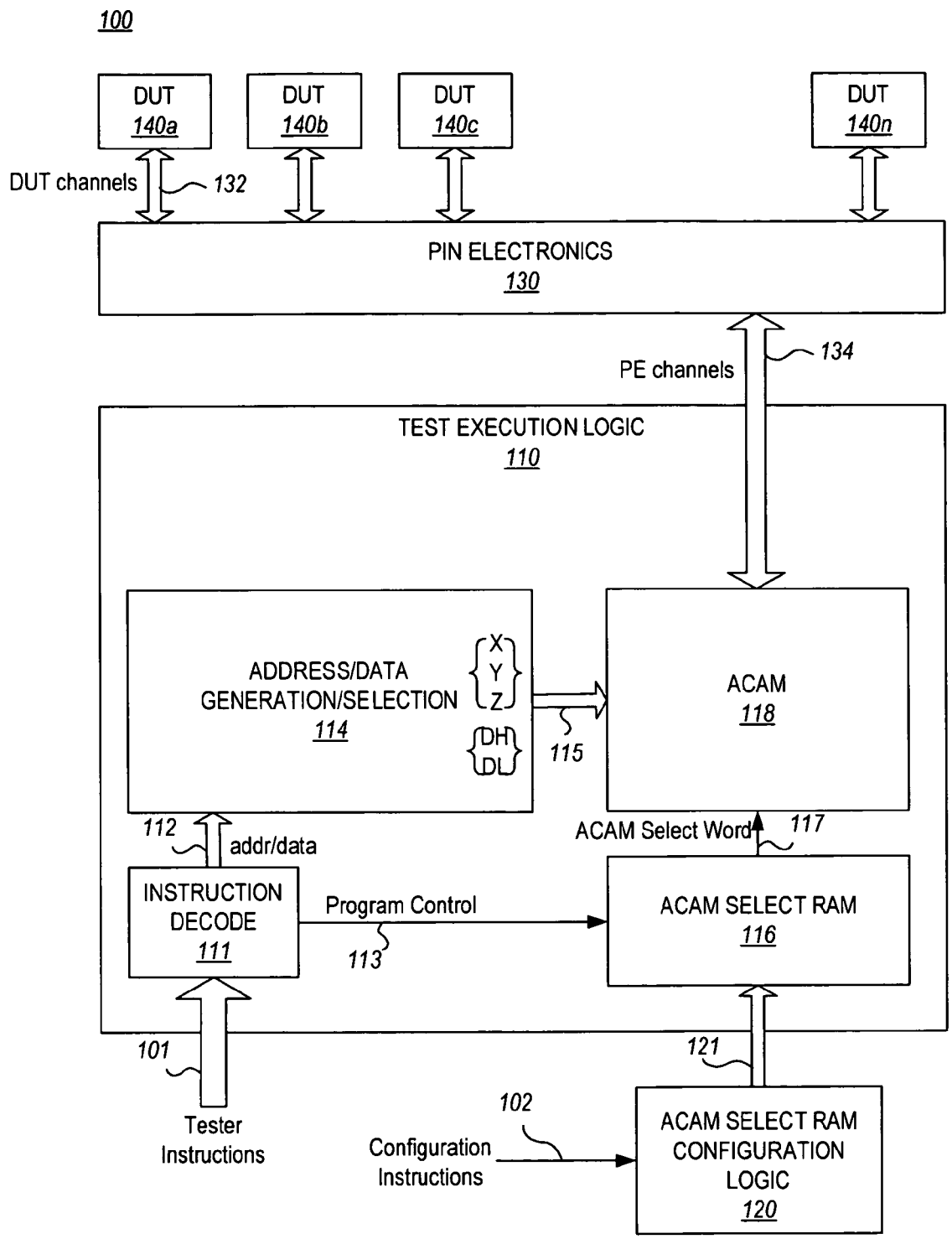
FIG. 1 is a block diagram of a test environment that tests a plurality of devices under test.

FIG. 1 shows a test environment for simultaneously testing a plurality of identical DUTs (140*a* through 140*n*). Stimulus signals may be applied to, and response signals may be received from, various DUT channels 132 by the DUTs 140*a* through 140*n*. Because the DUTs 140*a* through 140*n* are identical, the DUT channels 132 of each DUT correspond to identical corresponding DUT channels of every other identical DUT. However, each of the DUT channels 132 is connected to a different unique PE channel 134 in the tester.

As used herein, the term "DUT channel" may include a pin, a pad, a solder bump, a PCB test point, a trace, or any other conductive component on which electrical signal data is applied to or output from the DUT. The connection of DUT channels 132 to PE channels 134 is performed in the pin electronics circuitry 130, typically using a set of programmable relays. The pin electronics 130 also includes circuitry necessary for generating signal level and timing and for converting signals received from DUT channels 132 into digital format.

The tester 100 includes test execution logic 110 which generates test vectors to apply to the DUTs and which receives test response vectors from the DUTs. The values and timing of the vectors to be applied to the DUTs is determined by test execution software, which may be configurable by a user (e.g., a test operator). The actual generation of the vectors and timing may be performed in the pin electronics module 130.

The test execution logic 110 is configurable to allow testing of DUTs implemented based on different DUT designs. The configuration of the test execution logic 110 is performed prior to execution of a test. The configuration of the test execution logic 110 is facilitated by test execution configuration logic 120, which is responsive to configuration instructions 122 to configure the test execution logic 110 specific to the particular DUT design of the DUTs to be tested. The test execution configuration logic 120 is not active during actual execution of tests on the DUTs by the test execution logic 110.

Embodiments of the invention take advantage of the identicality of the DUTs 140a through 140n in configuring the test execution logic 110. In particular, the test execution logic 110 may include an ACAM circuit 118, operating under the control of an ACAM control circuit 116, and having as input address and data components from tester resources. The ACAM circuit 118 operates in conjunction with a present test execution instruction field 113 generated by test instruction decode circuitry 111 based on received tester instructions 101 to dynamically connect tester resources to PE channels 136 relevant to the present test execution instruction 101.

Embodiments of the invention include test execution configuration logic 120 which facilitates efficient configuration of the test execution logic associated with the aforementioned functioning of the ACAM circuit 118. In particular, embodiments of the invention facilitate efficient configuration of the ACAM control circuit 116 during test setup (i.e., prior to test execution).

Figure 2:
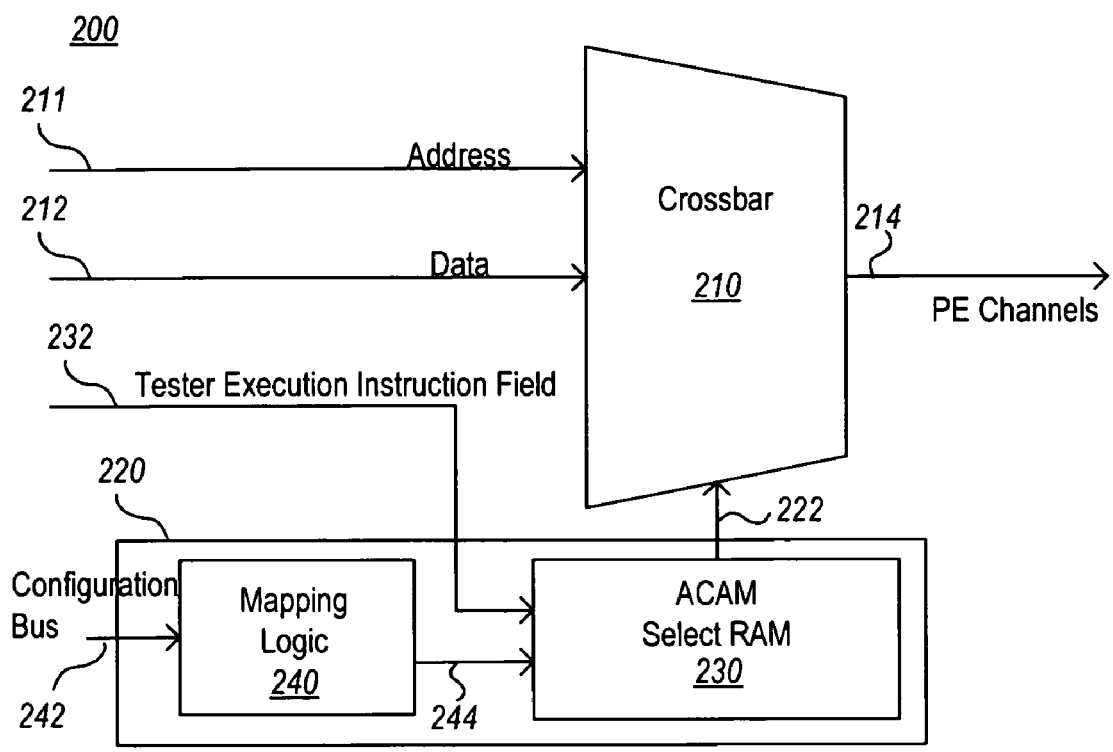
FIG. 2 is a high-level block diagram illustrating an embodiment of an ACAM and its associated ACAM configuration circuit.

FIG. 2 is a high-level block diagram illustrating an embodiment 200 of an ACAM and its associated ACAM configuration circuit. As described previously, the ACAM crossover circuit 118 must support reconfiguration on every bus transaction. Accordingly, in one embodiment, the ACAM crossover circuit 118 is implemented with a crossbar 210 having as input all address bits 211 and all data bits 212 to be applied to the DUTs serviced by this crossbar 210. The crossbar 210 is a large multiplexer circuit. The outputs 214 of the crossbar 210 connect to selected PE channels 214 as selected by select control logic 220. The specific input-to-output connections provided in the crossbar 210 at any point in time are determined by select control 222 generated by the select control logic 220. The select control logic 220 in the illustrative embodiment is implemented as a random access memory (RAM), known as the ACAM Select RAM 230. Each addressable location in the ACAM Select RAM 230 contains a separate and complete crossbar select control setting. A field in the test execution instruction 232 may be used as an address into the ACAM Select RAM 230 to determine which Select RAM location is active. The active ACAM Select RAM location is output as the select control 222, which is connected to the selection control input of the crossbar 210. The crossbar 210 is responsive to the select control 222 to connect various ones of the address/data channels 211/212 to various ones of the PE channels 214. The contents of the active ACAM Select RAM location therefore determine the connectivity in the crossbar 210, and ultimately which address/data channel gets routed to which PE channel.

The ACAM Select RAM 230 allows the crossbar select control to be configurable "on-the-fly", that is, to be configurable from one test execution instruction 232 to the next. Thus, which error address/data channels 211/212 connects to which PE channels 214 may change from one test execution instruction 232 to the next, thereby changing crossbar 210 connectivity at up to the frequency of test execution instruction processing.

The select control logic 220 includes Mapping Logic 240 for facilitating fast loading of the ACAM Select RAM 230 and simplifying user specification of inputs and outputs. It permits tester resources (data/address sources) 211/212 to be specified in terms of PE channels 236 (and ultimately in terms of DUT channels). The Mapping Logic 240 is configurable via a configuration bus 242.

During test execution, only the ACAM Select RAM 230 and the ACAM Crossbar 210 are active. On each test execution instruction, one of the addressable locations in the ACAM Select RAM 230 is enabled and the contents of the enabled location is output as the select control 222, which configures the internal connectivity of the crossbar 201. On the next test execution instruction, a different ACAM Select RAM location may be enabled, resulting in a different select control 222 setting for the crossbar 210.

Figure 3:
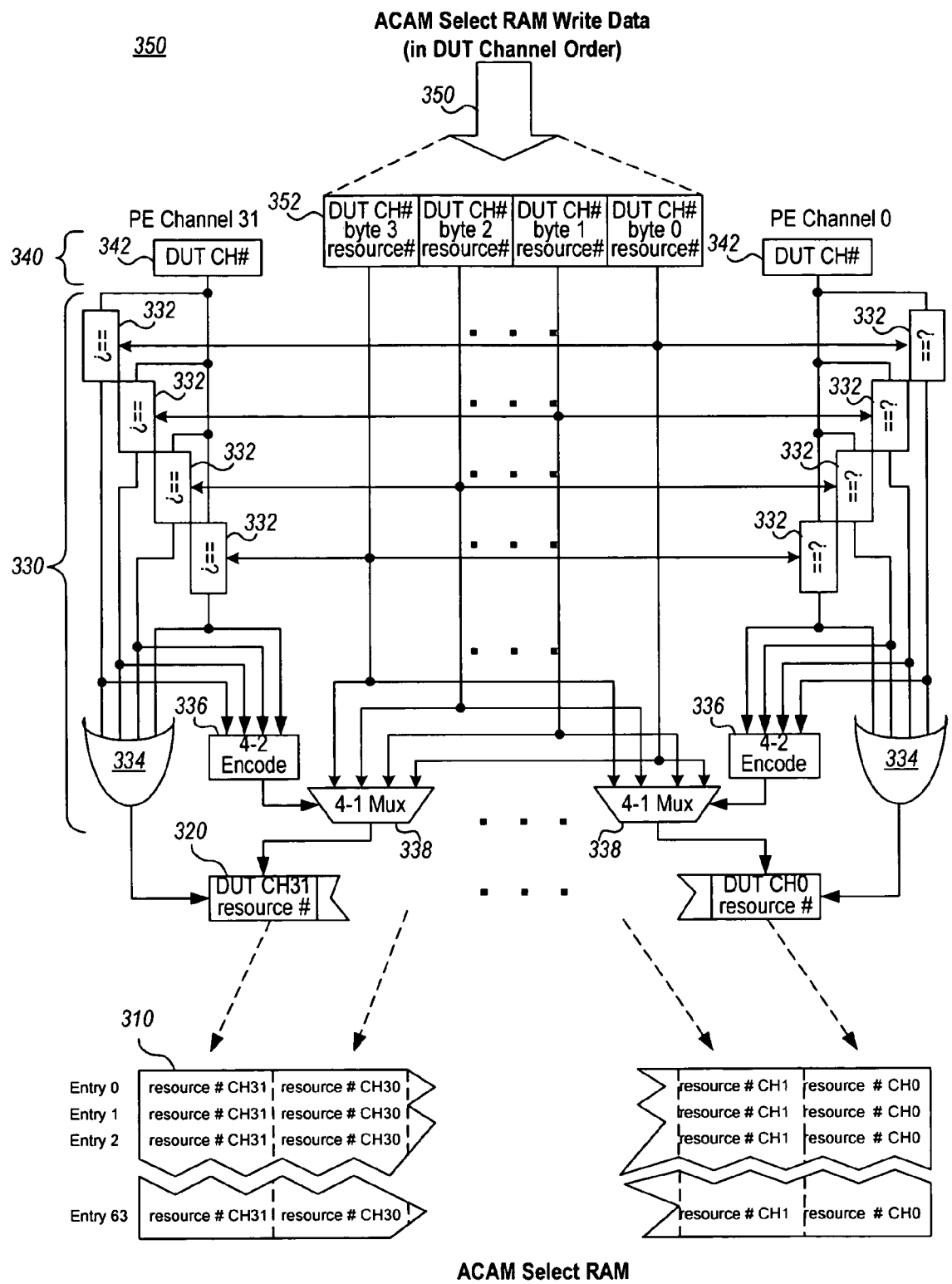
FIG. 3 is a block diagram of an embodiment of an ACAM crossover control configuration circuit.

FIG. 3 is a more detailed block diagram of an embodiment of circuitry 300 that allows configuration of the ACAM crossover control. In this embodiment, the major components to the address translation and ACAM loading logic includes DUT-to-PE-Channel translation circuitry 340, an ACAM load register 330, register loading logic 320, and the ACAM Select RAM 310.

A configuration bus 350 supplies configuration vectors 352 to the ACAM crossover control circuitry 300. The configuration bus may be wider than the external bus of the DUTs. For example, in the illustrative embodiment, the configuration bus is 32 bits wide, while the external bus of the DUTs is only 8 bits wide.

In order to most effectively utilize the configuration bus bandwidth, the configuration bus word may be partitioned into a plurality of sub-words (hereinafter "bytes", having a number of bits that correspond to a number of DUT channels to which write data is to be applied on a given DUT; thus, as used herein, the term "byte" may or may not be 8 bits wide). Each byte of the ACAM Select RAM write data contains the APG resource number for a given DUT channel. DUT channels in the ACAM are loaded in order: first DUT channels 0 through 3 are loaded; then DUT channels 4 through 7 are loaded, and so on.

Given a configuration vector, DUT-to-PE Channel translation circuitry 340 provides the PE channel numbers for each DUT associated with a given DUT channel number. The DUT-to-PE Channel translation circuitry 340 is used to convert the DUT channel number into a PE channel number.

In one embodiment, a Channel Map (CMAP) register 342 is maintained for each PE channel. Each CMAP register 342 is loaded during test setup with the real DUT ID number and DUT channel number associated with the respective PE channel. In the illustrative embodiment, there are 32 DUT channels, which will connect to 32 respective PE channels.

The configuration bus 350 applies configuration vectors 352 to the DUT-to-PE-Channel translation circuitry 340. Each channel then has a comparator 332 per byte for a total of 32 channels times 4 comparators or 128 comparators. The comparators 332 compare the channel's DUT channel number assignment to the downloaded ACAM information DUT channel number. The results of the 4 comparators per channel are ORed together to create a load enable signal to the ACAM load register 320. Additionally, a 4-to-1 multiplexer 338 selects the corresponding byte to be loaded into the ACAM load register 320. A 4-to-2 encoder 336 creates the multiplexer selects for the 4-to-1 multiplexer 338 from the individual comparator results.

Once the ACAM settings for all channels of the DUT are downloaded, a transfer to RAM operation occurs. Software may issue the transfer command.

Figure 4:
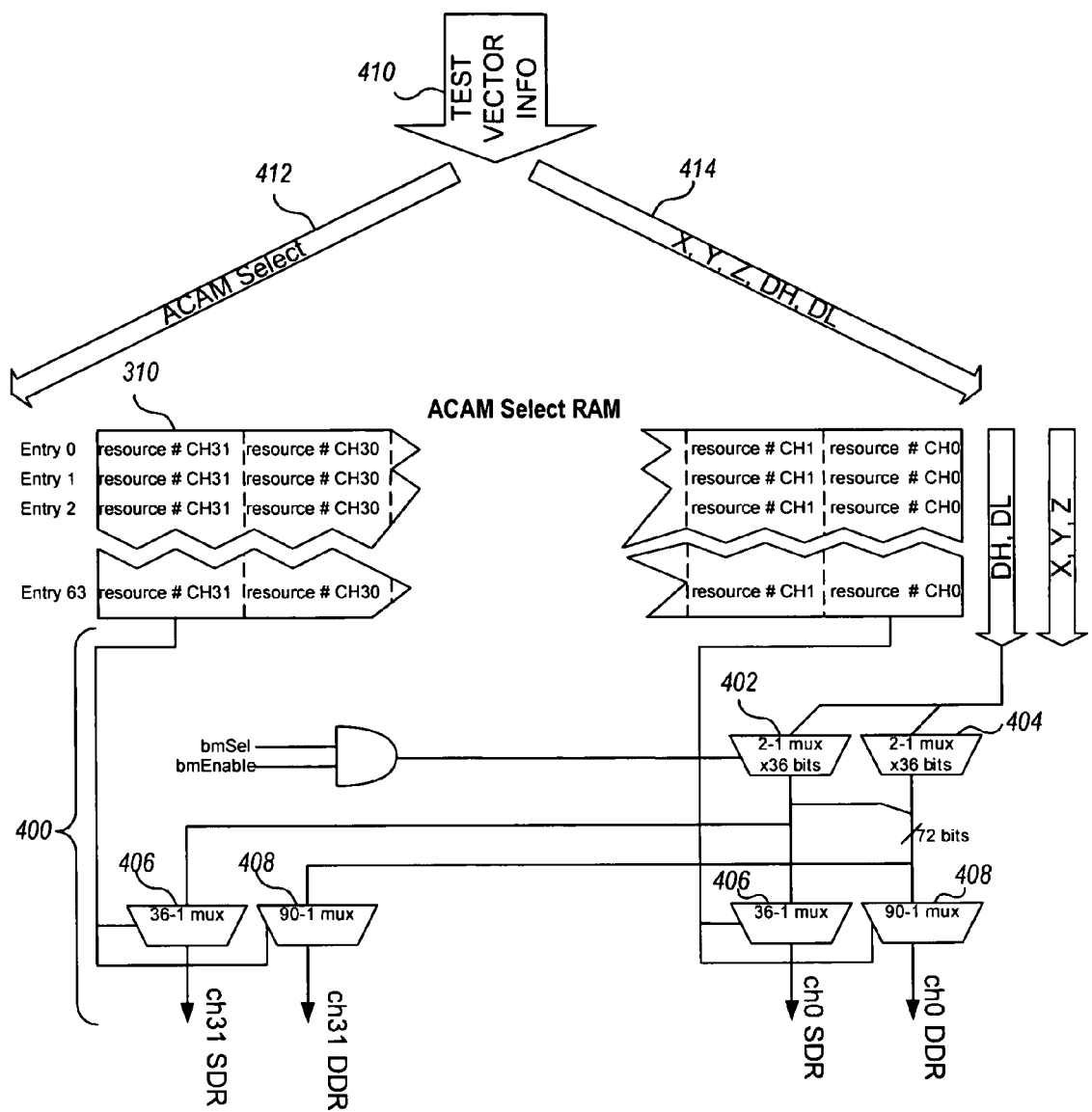
FIG. 4 is a schematic block diagram of an embodiment of an ACAM circuit.

FIG. 4 is a schematic block diagram of an embodiment of an ACAM multiplexer 400 and associated logic used to move APG data to the appropriate PE channel. The multiplexer 400 supports both single data rate (SDR) and double data rate (DDR) sampling. SDR sampling occurs on only one clock edge, whereas DDR samples on both clock edges, allowing the data to switch twice per clock cycle. The multiplexer 400 therefore includes a SDR data select multiplexer 402 which receives all the APG data (DH, DL, X, Y, Z), and selects data on one of the clock edges for output. The outputs of the SDR data select multiplexer 402 are input to a number of PE channel select SDRs 406, the number being equal to the number of PE channels, each of which selects a subset of the selected APG data for output onto its respective PE channel (CHx SDR). For DDR support, the multiplexer 400 also includes a DDR data select multiplexer 404 which receives all the APG data (DH, DL, X, Y, Z), and selects data on the other of the two clock edges for output. Both the outputs of the DDR data select multiplexer 404 and the outputs of the SDR data select multiplexer 402 are input to a number of PE channel select DDRs 408, the number being equal to the number of PE channels, each of which selects a subset of the selected APG data for output onto its respective PE channel (CHx DDR).

The ACAM Select RAM 310 (from FIG. 3) stores the select signals for each of the PE channel select multiplexers 406, 408. The entry in the ACAM Select RAM 310 that is enabled as the current select signal is determined by an ACAM Select field 412 in the current test vector 410.

In the illustrative embodiment, the SDR data select multiplexer 402 and DDR data select multiplexer are implemented with 2-to-1 multiplexers, outputting data 36 bits wide. The SDR PE channel multiplexer 406 is implemented with a 36-to-1 multiplexer, while the DDR PE channel multiplexer 408 is implemented with a 90-to-1 multiplexer (which in the illustrative embodiment must be at least a 72-to-1 multiplexer).

Also in the illustrative embodiment, the inputs to the main crossbar are the results of the algorithmic generators (post-scramble) X, Y, Z, and data high and low (DH, DL, where data high and low could have been replaced by buffer memory). The inputs to the DDR data select multiplexer 404 consist only of the data high generator (which could have been replaced by buffer memory).

For better understanding of the configuration process, first consider how a user specified the resource mapping to PE channels using previous testers. In these testers, the user specified ACAM connections using direct PE channel numbers along with address/data pin numberings such as that found below:

@acam cam_set_x{0:48, 1:49, . . . , 15:63}

The PE channel numbers are directly mapped and the APG resource connections are unclear given the DUT crossover intervention and arbitrary numbering convention going into the ACAM. In a tester that tests many tens or even hundreds of DUTs simultaneously, this requires the user to know and explicitly specify to the tester on the order of thousands of different resource-to-PE channel mappings—a tedious process at best. Furthermore, the above syntax also resulted in very long tester instruction statements (requiring a lot of typing), which is prone to user error.

Now, to illustrate the advantages of the present invention, consider the following example illustrating the ACAM Select RAM loading process. Assume the configuration tester instruction file contains the following statements (where "acam" refers to the configuration hardware of the ACAM circuit):

@acam cam_set_x{0:X0, 1:X1, . . . , 15:X15}

The specific syntax depends on the tester instruction compiler. The compiler translates the APG resource number (e.g., X15) into a hexadecimal number that operates using multiplexer selects to choose the specified associated PE channel. The DUT pin numbers are used by a translation table to put APG resource selection into the correct location of the ACAM Select RAM.

Figure 5:
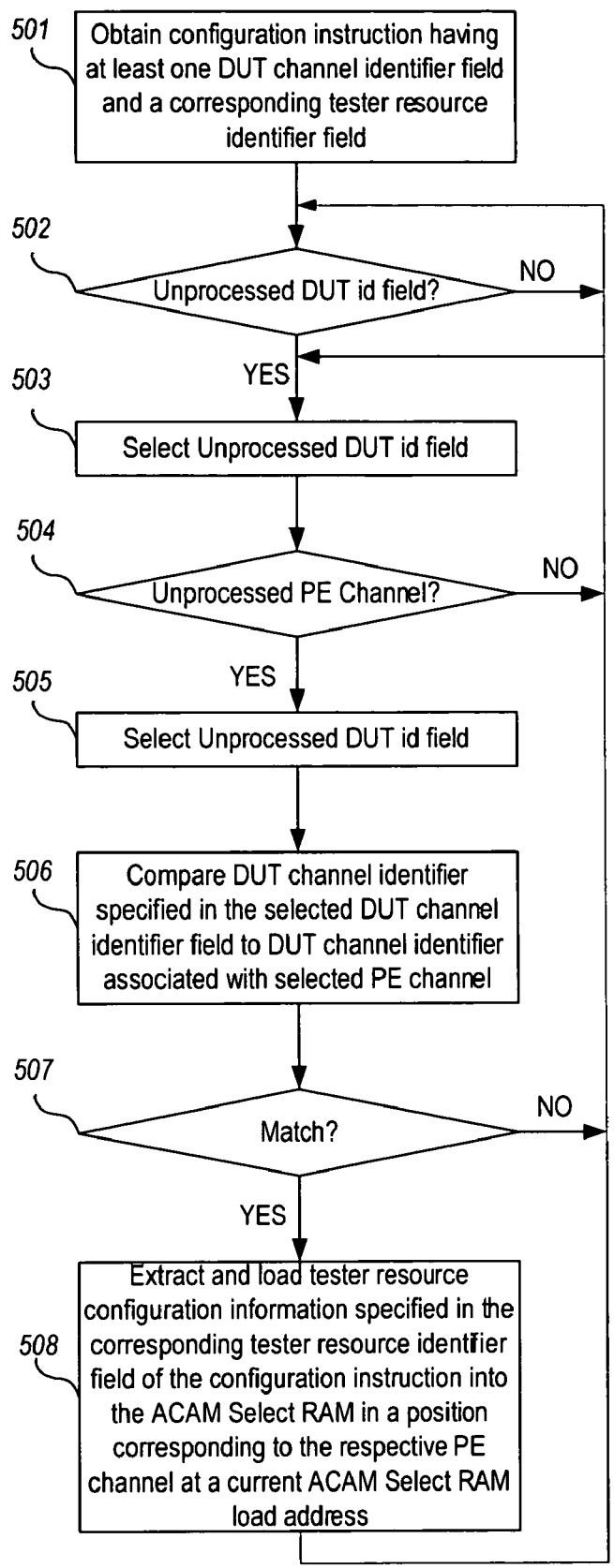
FIG. 5 is an operational flowchart illustrating an embodiment of a method for configuring an ACAM Select RAM.

FIG. 5 is a flowchart illustrating an embodiment of a method 500 of the invention. The method 500 is for configuring an ACAM Select RAM for an ACAM circuit of a tester that tests multiple DUTs each comprising a number of identical corresponding DUT channels to be probed by the tester, each of the DUT channels associated with and connecting to a different PE channel in the tester. In method 500, a configuration instruction is obtained, the configuration instruction comprising at least one DUT channel identifier field and a corresponding tester resource identifier field (step 501). For each PE channel (step 504 and 505) and for each DUT channel identifier field in the configuration instruction (step 502 and 503), the DUT channel identifier specified in the DUT channel identifier field of the configuration instruction is compared to the respective DUT channel identifier mapped to the respective PE channel (step 506). Then, for each PE channel whose respective DUT channel identifier matches the specified DUT channel identifier (step 507), tester resource configuration information specified in the corresponding tester resource identifier field of the configuration instruction is loaded into the ACAM Select RAM in a position corresponding to the respective PE channel at a current ACAM Select RAM load address (step 508).

The advantages afforded by the present invention are many. First, the ACAM includes all the address lines. In previous products, a DUT address crossover reduces the X, Y, and Z address to a 32-bit DUT address and then sends the data to an ACAM that receives 32 bits of address and 32 bits of data. In embodiments of the present invention, the ACAM includes all address bits and the data field may be increased. Because all address bits are fed to the ACAM, the DUT crossover is redundant and therefore is eliminated. Additionally, the primary ACAM selection loading logic translates DUT pin numbers to physical tester PE channels so that the user can request ACAM connections via APG (tester) resource and DUT pin number. This allows the ACAM configuration for all DUTs to be programmed in parallel.

Those of skill in the art will appreciate that the functionality of the above-described functional elements may alternatively be implemented in software or firmware, or a suitable combination of software/firmware and hardware. Thus, those of skill in the art will appreciate that the method and apparatus of the invention may be implemented by a computer or microprocessor process in which instructions are executed, the instructions being stored for execution on a computer-readable medium and being executed by any suitable instruction processor. Alternative embodiments are contemplated, however, and are within the spirit and scope of the invention.

Although this preferred embodiment of the present invention has been disclosed for illustrative purposes, those skilled in the art will appreciate that various modifications, additions and substitutions are possible, without departing from the scope and spirit of the invention as disclosed in the accompanying claims.

What is claimed is:

1. A method for configuring an ACAM Select RAM for an ACAM circuit of a tester that tests multiple devices under test (DUTs), the multiple DUTs each comprising a number of DUT channels to be probed by the tester, each of the DUT channels mapped to and connecting to a different PE channel in the tester, the method comprising:

obtaining a configuration instruction, the configuration instruction comprising at least one DUT channel identifier field and a corresponding tester resource identifier field;

for each PE channel and for each DUT channel identifier field in the configuration instruction, comparing the DUT channel identifier specified in the DUT channel identifier field of the configuration instruction to the respective DUT channel identifier mapped to the respective PE channel; and for each PE channel whose respective DUT channel identifier matches the specified DUT channel identifier, extracting and loading tester resource configuration information specified in the corresponding tester resource identifier field of the configuration instruction into the ACAM Select RAM in a position corresponding to the respective PE channel at a current ACAM Select RAM load address.

2. A method for configuring an ACAM Select RAM for an ACAM circuit of a tester that tests multiple identical devices under test (DUTs), the identical DUTs each comprising a number of identical corresponding DUT channels to be probed by the tester, each of the DUT channels mapped to and connecting to a different PE channel in the tester, the method comprising:

obtaining a configuration instruction, the configuration instruction comprising at least one DUT channel identifier field and a corresponding tester resource identifier field, the at least one DUT channel identifier field corresponding to an associated DUT channel on each of the multiple identical DUTs;

for each PE channel and for each DUT channel identifier field in the configuration instruction, comparing the DUT channel identifier specified in the DUT channel identifier field of the configuration instruction to the respective DUT channel identifier mapped to the respective PE channel; and for each PE channel whose respective DUT channel identifier matches the specified DUT channel identifier, extracting and loading tester resource configuration information specified in the corresponding tester resource identifier field of the configuration instruction into the ACAM Select RAM in a position corresponding to the respective PE channel at a current ACAM Select RAM load address, wherein all PE channels associated with the DUT channel on each of the multiple identical DUTs associated with the DUT channel identifier are loaded simultaneously.

3. An ACAM control configuration circuit for loading an ACAM Select RAM, comprising:

a programmable DUT-to-PE-Channel translator which associates DUT channels of respective DUTs to corresponding respective PE channels;

a comparator circuit which compares one or more respective DUT channel identifiers specified in corresponding one or more respective DUT channel identifier fields of a configuration instruction to the respective DUT channel identifiers associated with the corresponding respective PE channels, and which selects one or more PE channels whose corresponding DUT channel identifier matches the specified one or more respective DUT channel identifiers; and a loading circuit which loads tester resource configuration information specified in respective tester resource identifier fields corresponding to the one or more respective DUT channel identifiers of the configuration instruction into the ACAM Select RAM in respective positions corresponding to the respective selected PE channels at a current ACAM Select RAM load address.

* * * * *